UNITED STATES PATENT OFFICE.

THOMAS H. LEAMING, OF BUFFALO, NEW YORK, ASSIGNOR TO NATIONAL ANILINE & CHEMICAL COMPANY, INC., OF NEW YORK, N. Y., A CORPORATION OF NEW YORK.

DISAZO DYE.

1,365,040.  Specification of Letters Patent.  Patented Jan. 11, 1921.

No Drawing.    Application filed February 16, 1920.  Serial No. 359,109.

*To all whom it may concern:*

Be it known that I, THOMAS H. LEAMING, a citizen of the United States, residing at Buffalo, in the county of Erie, State of New York, have invented certain new and useful Improvements in Disazo Dyes; and I do hereby declare the following to be a full, clear, and exact description of the invention, such as will enable others skilled in the art to which it appertains to make and use the same.

The present invention relates to a new disazo dye which is of value for dyeing cotton, silk or wool, as well as mixed or union goods composed of these fibers. The invention includes also the dyed fabrics or other materials, dyed with the new dyestuff.

The new dyestuff can be obtained by the diazotization of acet-p-phenylenediamin or of p-nitranilin, coupling the diazo compound so obtained with one molecular proportion of o-anisidin, rediazotizing the resulting monoazo dye, and coupling this secondary diazo compound with one molecular proportion of 2-amino-8-naphthol-6-sulfonic acid in alkaline solution, and subsequently saponifying the acetyl group or reducing the nitro group to give as the final product a dyestuff containing the free amino group. The new dyestuff has the following probable formula:

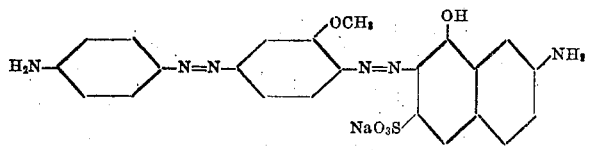

The following specific example will further illustrate the invention, the parts being by weight:

6.9 parts of p-nitranilin are diazotized by dissolving it in 16.8 parts of boiling hydrochloric acid of 1.19 sp. gr., which has been diluted with 20 parts of water, pouring the boiling solution into 9.6 parts of hydrochloric acid of 1.19 sp. gr., containing sufficient ice to keep the temperature at 0° C., and adding 3.5 parts of sodium nitrite all at once to the resulting cold suspension. It will be understood that the apparatus in which the solution and suspension are made is provided with good agitating means. The nitrite may be added in a solid form or in a solution of convenient strength; so also, instead of sodium nitrite, other nitrites, such as potassium nitrite can be used. The amount referred to above is based on 100% purity; if less pure an equivalent amount should be used. After the addition of the sodium nitrite, and after the solution has been permitted to stand for a few moments, air is blown through the solution until any excess nitrous acid is expelled, the temperature being kept at 0° C. by suitable cooling means.

The cold diazotized p-nitranilin solution produced as above described is poured into a solution of 6.2 parts of o-anisidin in 200 parts of water and 47.6 parts of hydrochloric acid of 1.19 sp. gr. while maintaining the temperature at about 0° C. Sodium acetate is added to the resulting solution or mixture until it is no longer acid to Kongo paper, and the stirring is continued until the coupling is complete. The monoazo dye thus produced is then filtered and suspended in dilute hydrochloric acid (approximately 30 parts of HCl to 1500 parts of water). This suspension is cooled to from 0 to 10° C., and a concentrated solution of 3.5 parts of sodium nitrite added with stirring, the stirring being continued until nitrous acid is no longer present as indicated by testing with starch-iodid paper.

12 parts of 2-amino-8-naphthol-6-sulfonic acid (gamma acid) are dissolved in 175 parts of water containing 40 parts of soda ash, and to the resulting cooled solution there is slowly added the secondary diazo solution produced as above described, the temperature being kept below 10°, and the mixture well agitated until coupling is complete. The solution is then heated to about 70° C., common salt added to separate the dyestuff, and the dyestuff filtered off.

The product can be purified by re-solution and reprecipitation to remove any impurities, particularly any red monoazo dye which may be formed as a by-product. The precipitated dye is then suspended in 3000 parts of water, heated to 70° C., and a concentrated solution of crystallized sodium sulfid added until the reduction of the nitro group to the amino group is complete, after which the reduced dyestuff is separated from solution by the addition of salt, and dried at about 70° C.

Diazotized acet-p-phenylenediamin may be used in place of diazotized-p-nitranilin, but it is less advantageous and requires a relatively much longer time to couple with o-anisidin; and I regard the process making use of p-nitranilin as more advantageous and to be recommended.

The dyestuff produced as above described, in its dried and powdered state, is a brownish black powder soluble in water with a reddish blue color, giving with hydrochloric acid a reddish brown precipitate and with sodium hyroxid a bluish black precipitate. It is soluble in alcohol, soluble in concentrated sulfuric acid with a blue-green color turning blue on the addition of ice and finally giving a red precipitate. The dye yields upon reduction with stannous chlorid and hydrochloric acid p-phenylenediamin, methoxy-p-phenylenediamin and 2.7-diamino-8-naphthol-6-sulfonic acid.

The new dyestuff is a direct dye, dyeing both vegetable and animal fibers, as well as union fabrics composed of mixed fibers. It is therefore applicable to cotton, silk or wool and to mixed goods composed of these materials. As a direct dye, it yields a fairly bright blue black shade of a reddish tone, which shade may be changed to bright shades of navy blue and various degrees of red or greenish blacks by diazotizing on the fiber, and developing with such developers as beta-naphthol, m-toluylenediamin, resorcinol, etc., or mixtures of these. The fastness is thereby increased, and the application value of the product enhanced. The dyestuff is a level dyeing product of good tone and strength, and has good fastness to acids, light and washing.

I claim:

1. The hereindescribed new disazo dye having the following probable formula:

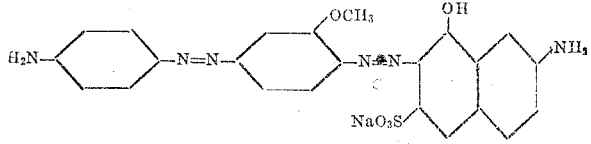

said dye in its dried and powdered state being a brownish black powder soluble in water with a reddish blue color, soluble in alcohol, soluble in concentrated sulfuric acid with a bluish green color, and yielding upon reduction with stannous chlorid and hydrochloric acid p-phenylenediamin, methoxy-p-phenylenediamin and 2.7-diamino-8-naphthol-6-sulfonic acid, and dyeing animal and vegetable fibers, as well as mixtures of such fibers, blue black shades which can be developed on the fiber.

2. The hereindescribed new dye obtainable by diazotizing the new disazo dye of claim 1 and developing with a developing agent.

3. Materials dyed with the new disazo dye of claim 1.

4. Union goods dyed with the new disazo dye of claim 1.

5. Materials dyed with the new disazo dye of claim 1, said dye being developed on the material.

In testimony whereof I affix my signature.

THOMAS H. LEAMING.